United States Patent
Kunkeler et al.

(10) Patent No.: US 6,855,427 B2
(45) Date of Patent: Feb. 15, 2005

(54) AMORPHOUS SILICA PARTICLES COMPRISING BORON

(75) Inventors: Paulus Johannes Kunkeler, Weert (NL); Willem Hendrik Dokter, Almere (NL)

(73) Assignee: Grace GmbH & Co. KG., Worms (DE)

(*) Notice: Subject to any disclaimer, the term of this patent is extended or adjusted under 35 U.S.C. 154(b) by 0 days.

(21) Appl. No.: 10/220,753

(22) PCT Filed: Feb. 27, 2001

(86) PCT No.: PCT/EP01/02319

§ 371 (c)(1),
(2), (4) Date: Mar. 14, 2003

(87) PCT Pub. No.: WO01/64580

PCT Pub. Date: Sep. 7, 2001

(65) Prior Publication Data

US 2003/0159623 A1 Aug. 28, 2003

(30) Foreign Application Priority Data

Mar. 3, 2000 (EP) ............................................. 00200781

(51) Int. Cl.⁷ .................................................. B32B 5/16
(52) U.S. Cl. .................... 428/403; 427/215; 427/443.2; 428/404; 428/331
(58) Field of Search ................................. 428/403, 404, 428/331, 405, 402; 427/215, 443.2

(56) References Cited

U.S. PATENT DOCUMENTS

| | | | | |
|---|---|---|---|---|
| 2,630,410 A | | 3/1953 | Ciapsadie et al. | 252/313 |
| 3,853,384 A | * | 12/1974 | Pinnow et al. | 385/141 |
| 4,011,006 A | * | 3/1977 | Fleming et al. | 385/141 |
| 4,029,513 A | * | 6/1977 | Vessey et al. | 106/482 |
| 4,056,488 A | * | 11/1977 | Mitchell et al. | 502/232 |
| 4,289,681 A | * | 9/1981 | Nauroth et al. | 524/405 |
| 4,613,720 A | * | 9/1986 | Bonifaz et al. | 585/640 |
| 4,764,497 A | * | 8/1988 | Yuasa et al. | 502/235 |
| 5,057,295 A | * | 10/1991 | Flanigen et al. | 423/705 |
| 5,246,624 A | * | 9/1993 | Miller et al. | 516/86 |
| 5,250,484 A | * | 10/1993 | Beck et al. | 502/71 |
| 5,861,134 A | * | 1/1999 | Swanson | 423/335 |
| 6,090,990 A | * | 7/2000 | Yao et al. | 585/418 |
| 6,180,809 B1 | * | 1/2001 | Pillot et al. | 556/402 |

FOREIGN PATENT DOCUMENTS

| | | | | |
|---|---|---|---|---|
| DE | 27 16 225 A1 | 10/1978 | | C09C/1/30 |
| EP | 0 941 995 A2 | 9/1999 | | C07F/5/02 |
| EP | 0 943 648 A1 | 9/1999 | | C08K/3/38 |
| EP | 0 631 982 B1 | 1/2002 | | C01B/33/193 |

* cited by examiner

Primary Examiner—H. Thi Le
(74) Attorney, Agent, or Firm—William D. Bunch

(57) ABSTRACT

The invention pertains to an amorphous silica particle comprising 0.1 to $10^5$ ppm boron atoms, and optionally 0.05 to 15 wt. % aluminum atoms wherein the boron and aluminum atoms are covalently bonded to the oxygen atoms of the silica network. The amorphous silica particles are used as a reinforcing filler for rubber articles, particularly for tires, more particularly for tire treads.

22 Claims, No Drawings

AMORPHOUS SILICA PARTICLES COMPRISING BORON

The present invention pertains to amorphous silica particles comprising boron atoms, to a method of preparation of the same, and to their use as reinforcement fillers.

Precipitated silica is increasingly used as a filler for elastomers, such as rubber, particularly for use in tires for motor vehicles. There is a continuing need for alternatives and improved products in this rapidly developing field. More particularly, industry is interested in precipitated silica that is even easier to disperse in said elastomer and/or shows a more time/cost-efficient treatment, e.g. with coupling agents, before being fully dispersible in the elastomer, and that will result in elastomer compositions (after vulcanization/curing) with low heat build-up, high wet grip, and low rolling resistance.

The presently claimed silica comprises boron atoms. In U.S. Pat. No. 2,630,410 aqueous silica sols are disclosed the stability of which is improved by the addition of boric acid, sodium tetraborate, or the like. The boron compounds are only added to the silica sols as stabilizer, whereas the silica sol as such is not changed by the addition of said boron compound.

In DE 2,716,225 precipitated silica is disclosed containing 4–20 wt. % of $B_2O_3$. These silica compositions are used in organopolysiloxane elastomers. The silica of these compositions is not changed as such, but is obtained as particles impregnated with $B_2O_3$.

Recently, patent applications EP 943,648 and EP 941,995 were published, both of which pertain to rubber blends to which silica and a borate compound are added separately to improve the reaction rate between the silica and the added silane coupling agents.

It was now found that the use of a new specific type of precipitated silica results in a further improvement of the reaction rate between the silica and the silane coupling agent, and in an improvement of the dispersion of the silica particles in rubber compositions. The benefits of the instant invention reside in an amorphous silica particle comprising 0.1 to $10^5$ ppm boron atoms, characterized in that the boron atoms are covalently bonded to the oxygen atoms of the silica network. More preferably, the silica particle comprises 10 to 125,000 ppm boron atoms.

Contrary to what is claimed in the standard literature (for example, Ralph K. Iler, *The Chemistry Of Silica*, John Wiley & Sons, 1979), built-in boron is not easily washed out or hydrolyzed from the silica framework and thus does not leach appreciably under the acidic conditions attained when the silica slurry from the precipitation is acidified to, for instance, pH 4.

In EP 631,982 silica aggregates were disclosed wherein in addition to or as replacement for Al, other elements such as Fe, Mg, B, P, and S can be introduced to tailor the silica towards its performance in an elastomer. However, it was not disclosed which improvement could be obtained with these elements, nor which of these element should be selected to obtain a desired improvement. These aggregates, moreover, have high SA BET values due to their method of production that uses aging temperatures between 15 and 50° C.

A further improvement was found when apart from the covalently bonded boron also covalently bonded aluminum is present in the silica network. Therefore, the amorphous silica may further comprise 0.05 to 15 wt. %, preferably 0.8 to 2 wt. %, aluminum atoms which are covalently bonded to the oxygen atoms of the silica network. This improvement was not found with the other elements that were disclosed in EP 631,982.

Surprisingly, a new process has been found to make these novel precipitated silica particles pre-eminently suitable for use as a replacement for conventional precipitated silica particles in elastomer compositions. More particularly, the precipitated silica particles according to the invention can be characterized by a DBP oil absorption of 100–400 ml/100 g, preferably 150–300 ml/100 g, a BET surface area of 30–500 $m^2/g$, preferably 50–300 $m^2/g$, and more preferably 120–220 $m^2/g$, and a CTAB surface area of 30–350 $m^2/g$, preferably 50–300 $m^2/g$, and more preferably 120–220 $m^2/g$. The silica particles are preferably aged at a temperature of >60° C., more preferably at 65–90° C.

The methods for determining the DBP oil absorption, the BET and the CTAB surface area values are mentioned in the experimental part of the examples. Preferably, the precipitated silica according to the invention has a pore volume of 0.55–0.85 ml/g when measured in accordance with DIN 66133 (applying a pressure from 7 to 500 bar) using an equilibrium time during the analysis of 30 seconds.

The precipitated silica according to the invention is suitably produced in one or more of the following manners:

Boric acid ($H_3BO_3$) is dissolved in a water glass solution ($SiO_2/Na_2O$ weight ratio about 3.3, containing 15–25, preferably 17.5–20, more preferably about 18.5 wt. % $SiO_2$, and having a density of about 1.225 g/ml). Organic or inorganic acid (nitric acid, sulfuric acid, hydrochloric acid) is added, and the resulting boron-containing silica is filtered, washed, and dried.

Boric acid is dissolved in a water glass solution. A water-soluble aluminum salt is added, and the resulting aluminum borosilicate is filtered, washed, and dried.

Boric acid is dissolved in a water glass solution. An aluminum salt (e.g., sulfate, nitrate, phosphate) is added to an acid solution. The acid solution is added to the water glass solution, and the resulting aluminum borosilicate is filtered, washed, and dried.

Borax ($Na_2B_4O_7 \cdot 10H_2O$) is dissolved in water. Acid, optionally containing aluminum salts, may be added to increase the solubility. Borax solution, water glass, and acid are simultaneously pumped into the reaction vessel. The resulting boron-containing silica is filtered, washed, and dried.

Boric acid is dissolved in water, base may be added to increase solubility. Boric acid solution, water glass, and acid, optionally containing aluminum salts, are simultaneously pumped into reaction vessel. The resulting boron-containing silica is filtered, washed, and dried.

Borax is dissolved in acid. Said acid is combined with water glass. The resulting boron-containing silica is filtered, washed, and dried.

Borax and aluminum salts are dissolved in acid. This acidic solution is combined with water glass. The resulting aluminum borosilicate is filtered, washed, and dried.

Thus, generally, the amorphous silica particles of the invention can be made by a process comprising the steps of reacting an aqueous solution of water glass with boric acid and/or borax, and optionally also with an aluminum salt, at a pH of 10.5 or lower.

The silica particles are amorphous. Crystalline and glass-like particles are excluded, since these do not have advantageous properties when used as reinforcing filler in elastomers.

Since the effect of the instant silica particles is believed to reside at the surface of the particles, i.e. the number of free hydroxy groups at the surface of the particle, it is preferred that the boron atoms, and if present also the aluminum atoms, are contained at the surface of the particles. This can be achieved by first starting to make a conventional silica, and starting the addition of borax, boric acid, and aluminum salts after the initial stages of the silica manufacturing process.

Preferably, the sulfuric acid and the water glass are dosed below the level of liquid in the reactor, for example by using so-called dip-pipes, this in order to prevent high local concentrations of these components.

The weight ratio of the amount of $SiO_2$ introduced via the dosed water glass in the first water glass dosage stage to the amount of aqueous medium in the reactor preferably is from 1:9.7 to 1:19.5, more preferably about 1:13.5.

Furthermore, the weight ratio of the amount of $SiO_2$ introduced via the dosed water glass in the second water glass dosage stage to the amount of aqueous medium present in the reactor before the first dosage stage is from 1:24 to 1:46, preferably about 1:27.

It is to be understood that the term "precipitated silica" as used relates to precipitated silica in the powdered form. However, if so desired, the powder may be converted into granules, pearls, beads, or other similar shapes by means of compacting. For ease of handling, i.e. for (pneumatic) transport, reduced bridging in silos, and reduced dust formation, as well as for a more efficient use of storage space, the precipitated silica is preferably compacted before use. Compaction may furthermore facilitate blending/mixing of the silica into the elastomer. Hence, a compacting step is preferably included in the process of the invention. The most preferred compacting step involves a granulation step. Optionally, the process involves a milling step to ensure that the precipitated silica particles have a certain size distribution. It was found that the precipitated silica properties, inter alia the DBP oil absorption and the BET and CTAB surface areas, were hardly influenced by a granulation and/or a milling step.

The drying step in itself is not critical. As indicated, conventional drying steps, e.g. using a drying cabinet, spray-drying, flash drying, fluid bed drying, tray drying, rotary drying, and the like are all suitable. However, it was observed that the residence time of the precipitated silica in the dryer might influence its DBP oil absorption value. More specifically, drying times of just a few seconds to minutes (at higher temperatures) typically resulted in precipitated silica with a DBP absorption value near the higher end of the specified range, while slow drying, i.e. for tens of minutes or even hours, resulted in precipitated silica with a DBP absorption value near the lower end of the specified range.

The precipitated silica so obtained is pre-eminently suited for use in elastomers as a filler/reinforcing agent. The incorporation into the elastomer and the final elastomer composition are of the conventional type, except that the precipitated silica of the invention is applied. Favorable processing of the elastomer blend and excellent properties of the final elastomer article have been reported.

It is noted that the term "elastomer" as used throughout this document is meant to denominate all elastomeric compositions typically used in the industry. More particularly, it is a synthetic or natural rubber-comprising composition that may contain all the usual additives known in the art that are required to obtain finished articles comprising said (cured) compositions. As the use of the precipitated silica in tires is of particular interest and because the precipitated silica according to the invention is pre-eminently suited to such use, the term "elastomer compositions" includes rubber compositions for use in tire treads. However, the precipitated silica according to the invention may also be used as a filler in rubber compositions for use as, e.g., motor mounts, conveyor belts, and the like.

The following examples serve to illustrate the invention.

General

| Chemicals used | Supplier |
|---|---|
| $CaSO_4.2H_2O$ | Merck, "foodgrade 516A" |
| Sulfuric acid | Baker, "analyzed, 95–97%", or |
| | Akzo Nobel, "technically pure", 96% |
| Water glass | Akzo-PQ Silica, "38–40Be, $SiO_2/Na_2O$ = 3.27–3.33" |

The BET surface area was analyzed in accordance with the method described by Brunauer, Emmet, and Teller, *The Journal of the American Chemical Society,* Vol. 60, page 309, 1938.

The CTAB surface area was analyzed in accordance with method NFT 45007, November 1987.

The DBP oil absorption was analyzed in accordance with method ASTM D 1208.

The water absorption expressed in wt. % is defined as the weight difference between the dry sample and the wetted sample. The water activity is equal to the water absorption per unit of BET Surface Area. The amount of absorbed water depends on the surface area of the silica. The water activity should therefore be compared to the water absorption of silica particles with different surface areas.

$$H_2O_{activity}(\mu mol \cdot m^{-2}) = \frac{\frac{1}{SA(m^2 \cdot g^{-1})} \cdot \frac{H_2O_{absorption\ (wt\ \%)}}{100}}{18.02(g \cdot mol^{-1})} \cdot 10^6$$

To increase reproducibility, a reference sample is always incorporated into the measurement cycle and the water activity of all samples is expressed relative to this reference sample. By definition, the water activity of this reference sample is 1.00.

Improvements to the unmodified silica are expressed as percentages, setting the unmodified silica at 100%.

EXAMPLE 1

Silica particles were prepared according to methods A–D.

Method A

Comparison Example not Containing Boron or Aluminum

The precipitated silica was suitably produced in the following way: A well-stirred vessel of 0.030 $m^3$ was charged with about 16.4 kg of demineralized water containing about 20 ppm $Ca^{2+}$. The contents were heated to 80° C. and maintained at this temperature throughout the following steps. Water glass ($SiO_2/Na_2O$ weight ratio about 3.3, containing 18.5 wt. % of $SiO_2$, and having a density of about 1.225 g/ml) was dosed to the vessel at a rate of 75 g/min, for 90 min, so that about 6.6 kg of water glass were dosed. While the water glass was being dosed, sulfuric acid (18 wt. %) was dosed as well. The dosing rate was chosen such that the pH during the precipitation of the silica was 9.3. About 2.8 kg of sulfuric acid (17.5 wt. %) were dosed. When the dosing was stopped, the reaction mixture was allowed to after-react at said pH for 15 min. Next, sulfuric acid was dosed in 10 min, so that the pH was lowered to 7.5. About 0.5 kg of sulfuric acid (17.5 wt. %) was needed for this purpose. Water glass (18.5 wt. % of $SiO_2$) was again dosed to the reactor at about the same rate as before for 45 min.

About 2.8 kg of water glass were dosed. Sulfuric acid was dosed at the same time to ensure that the pH was kept constant at 7.5. About 1.4 kg (17.5 wt. %) were needed for this purpose. When the dosing was stopped, sulfuric acid was dosed in 20 min, so that the pH was lowered to 4.0. About 0.2 kg of sulfuric acid (17.5 wt. %) was needed for this purpose. The precipitated silica was removed from the reactor, washed in a conventional way, by means of a filter press, and dried using a spin flash dryer.

Method B

Silica was prepared in the same manner as in method A, but 36.2 g of boric acid were dissolved in the water glass solution. This boric acid/water glass solution was added simultaneously with sulfuric acid to a reactor containing water ("the heel"). The resulting precipitated amorphous boron-containing silica (boron built in throughout the entire structure) was filtered, washed, and dried.

Method C

Silica was prepared in the same manner as in method A, but 36.2 g of boric acid were dissolved in the water glass solution. Instead of 0.2 kg of sulfuric acid, 0.3 kg of aluminum sulfate solution was added to lower the pH to 4.0.

Method D

Silica was prepared in the same manner as in method A, but instead of 0.2 kg of sulfuric acid, 0.3 kg of aluminum sulfate solution was added to lower the pH to 4.0.

In all methods A–D the following solutions were used:

The water glass solution contained approx. 18.5 wt. % $SiO_2$ and in methods B and C 0.067 wt. % boron was used. In methods C–D the $Al_2(SO_4)_3$ solution used had a concentration of approx. 17.5 wt. % and was only used for the acidification from pH 7.5 to pH 4.0. The silica particles were spin flash dried.

TABLE 1

Analyses of the boron-containing silica particles prepared according to methods A–D

| method | DBP ml/100 g | w.a. % | SA BET $m^2/g$ | CTAB $m^2/g$ | B (wt. %) | Al[#] (wt. %) |
|---|---|---|---|---|---|---|
| A | 211 | 100 | 187 | 171 | 0 | 0.11 |
| B | 221 | 106 | 184 | 163 | 0.06 | 0.11 |
| C | 222 | 110 | 184 | 161 | 0.06 | 0.27 |
| D | 202 | 108 | 186 | 162 | 0 | 0.27 |

[#]0.11 wt. % Al was present as contamination in the silica

Table 1 makes clear that the incorporation of boron via method B (the water glass solution containing 0.067 wt. % boron) results in a significant increase in the water absorption and concomitantly in an increase in the DBP oil absorption.

An increase in the water absorption has a positive influence on the coupling reaction between silica and a silane coupling agent, an increase in the DBP absorption has a positive influence on the dispersion in rubber blends. When method C was used, the synergistic effect of aluminum was clearly shown.

When a water glass solution containing 0.134 wt. % boron was used, the water absorption increased further while the DBP remained on the same level as when water glass containing 0.067 wt. % boron was used, see Table 2.

TABLE 2

Analyses of the boron-containing silica particles prepared according to methods B* and C*

| method | DBP ml/100 g | w.a. % | SA BET $m^2/g$ | CTAB $m^2/g$ | B (wt. %) | Al[#] (wt. %) |
|---|---|---|---|---|---|---|
| B* | 224 | 110 | 184 | 163 | 0.12 | 0.11 |
| C* | 225 | 121 | 179 | 156 | 0.11 | 0.27 |

[#]0.11 wt. % Al was present as contamination in the silica
Note:
Methods B* and C* are the same as methods B and C, respectively, but the water glass solution contains 0.134 wt. % boron.

When the boron concentration in water glass was increased to 0.201 wt. %, the water activity increased even further while the DBP remained on the same level as when the 0.067 or 0.134 wt. % boron in water glass solution was used.

The positive effects of built-in boron are not limited to the silica prepared according to the above-described method. In Table 3 the effects of boron incorporation and of boron and aluminum incorporation are given for a different grade of silica. Both the water activity and the DBP values increase. The synergistic effect of built-in aluminum is given here for both the water activity and the DBP absorption.

The silicas I–IV were prepared by simultaneously adding sulfuric acid and water glass, optionally containing boron (II–IV), to a reactor at a temperature of 70° C. and a pH of 9.3 for 150 min. After this, the reactor contents were acidified to pH 4 using sulfuric acid (silica I and silica II), or, alternatively, using an aluminum sulfate solution (silica III and silica IV).

TABLE 3

| silica | DBP ml/100 g | w.a. % | SA BET $m^2/g$ | CTAB $M^2/g$ | B (wt. %) | Al[#] (wt. %) |
|---|---|---|---|---|---|---|
| I | 206 | 100 | 205 | 161 | 0 | 0.1 |
| II | 225 | 116 | 199 | 152 | 0.06 | 0.1 |
| III | 257 | 124 | 207 | 152 | 0.05 | 1.1 |
| IV | 254 | 139 | 206 | 152 | 0.18 | 1.1 |

[#]0.1 wt. % Al was present as contamination in the silica
Silica I: not containing boron or aluminum
Silica II: modified with boron (0.06 wt. %)
Silica III: modified with boron (0.05 wt. %) and aluminum
Silica IV: modified with boron (0.18 wt. %) and aluminum

EXAMPLE 2

In this example the influence of the addition of B in comparison with the addition of P was determined.

Boric acid was added to the heel of the reaction mixture. The experiment proceeded as follows. First water was inserted into the reactor and subsequently boric acid was added to this amount of water (called "heel"). After complete dissolution, water glass and acid were added simultaneously to this water, maintaining a constant pH in the range between 7 and 10. After a reaction period, the reaction mixture was acidified to a pH of approximately 4, and the reaction mixture was filtered, washed, and dried (entry i).

In a similar experiment B was added in the form of boric acid during the simultaneous addition of water glass and acid (entry ii). In another experiment P was added in the form of phosphoric acid to the reaction mixture during simultaneous addition of the water glass and acid (entry iii). Alternatively, P was added in the form of phosphoric acid to the reaction mixture during the acidification step. The reaction was performed in exactly the same manner as described above, except that P was added by acidifying the reaction mixture from reaction pH (between 7 and 10) to pH 4 with phosphoric acid (entry iv). Standard silica was made in the same manner, but without addition B or P (entry 0).

|         | DBP ml/100 g | w.a. % | SA BET $m^2/g$ | CTAB $m^2/g$ |
|---------|--------------|--------|----------------|--------------|
| entry 0 | 220          | 100    | 223            | 158          |
| entry 1 | 236          | 109    | 198            | 162          |
| entry 2 | 225          | 109    | 200            | 161          |
| entry 3 | 224          | 92     | 224            | 163          |
| entry 4 | 215          | 100    | 218            | 161          |

It can be concluded that with regard to the standard silica the addition of B leads to increased activity, decreased BET/CTAB ratio, and increased DBP, whereas these values remain unchanged when P rather than B was added.

What is claimed is:

1. An amorphous silica particle comprising 0.1 to 125,000 ppm boron atoms, characterized in that the boron atoms are covalently bonded to the oxygen atoms of the silica network.

2. The amorphous silica particle of claim 1 comprising 10 to 125,000 ppm boron atoms.

3. The amorphous silica particle of claim 2 further comprising 0.05 to 15 wt. % aluminum atoms which are covalently bonded to the oxygen atoms of the silica network.

4. The amorphous silica particle of claim 3 comprising 0.8 to 2 wt. % aluminum atoms.

5. The amorphous silica particle of claim 4 having a BET surface area in the range of 30–500 $m^2/g$, a CTAB surface area in the range of 30–350 $m^2/g$, a DBP oil absorption in the range of 100–400 ml/100 g, and a moisture content greater than 2 wt. %.

6. The amorphous silica particle of claim 3 having a BET surface area in the range of 30–500 $m^2/g$, a CTAB surface area in the range of 30–350 $m^2/g$, a DBP oil absorption in the range of 100–400 ml/100 g, and a moisture content greater than 2 wt. %.

7. The amorphous silica particle of claim 2 having a BET surface area in the range of 30–500 $m^2/g$, a CTAB surface area in the range of 30–350 $m^2/g$, a DBP oil absorption in the range of 100–400 ml/100 g, and a moisture content greater than 2 wt. %.

8. The amorphous silica particle of claim 1 further comprising 0.05 to 15 wt. % aluminum atoms which are covalently bonded to the oxygen atoms of the silica network.

9. The amorphous silica particle of claim 8 comprising 0.8 to 2 wt. % aluminum atoms.

10. The amorphous silica particle of claim 9 having a BET surface area in the range of 30–500 $m^2/g$, a CTAB surface area in the range of 30–350 $m^2/g$, a DBP oil absorption in the range of 100–400 ml/100 g, and a moisture content greater than 2 wt. %.

11. The amorphous silica particle of claim 8 having a BET surface area in the range of 30–500 $m^2/g$, a CTAB surface area in the range of 30–350 $m^2/g$, a DBP oil absorption in the range of 100–400 ml/100 g, and a moisture content greater than 2 wt. %.

12. The amorphous silica particle of claim 11 wherein the boron atoms, and optionally aluminum atoms, are predominantly contained in the surface of the silica particle.

13. The amorphous silica particle of claim 8 wherein the boron atoms, and optionally aluminum atoms, are predominantly contained in the surface of the silica particle.

14. The amorphous silica particle of claim 1 having a BET surface area in the range of 30–500 $m^2/g$, a CTAB surface area in the range of 30–350 $m^2/g$, a DBP oil absorption in the range of 100–400 ml/100 g, and a moisture content greater than 2 wt. %.

15. The amorphous silica particle of claim 1 wherein the boron atoms are predominantly contained in the surface of the silica particle.

16. A process to make amorphous silica particles of claim 1 comprising the steps of reacting aqueous solution of water glass with boric acid and/or borax, and optionally with aluminum salt.

17. Use of amorphous silica particles of claim 1 as a reinforcing filler for rubber articles.

18. The use of claim 17 wherein the amorphous silica particles comprise 10–125,000 ppm boron atoms.

19. The use of claim 17 wherein the amorphous silica particles further comprise 0.05 to 15 wt. % aluminum atoms which are covalently bonded to the oxygen atoms of the silica network.

20. The use of claim 19 wherein the amorphous silica particles comprise 0.8 to 2 wt. % aluminum atoms.

21. The use of claim 17 wherein the amorphous silica particles have a BET surface area in the range of 30–500 $m^2/g$, a CTAB surface area in the range of 30–350 $m^2/g$, a DBP oil absorption in the range of 100–400 ml/100 g, and a moisture content greater than 2 wt. %.

22. The use of claim 17 wherein the boron atoms are predominantly contained in the surface of the silica particle.

* * * * *